(12) United States Patent
Park et al.

(10) Patent No.: US 8,402,560 B2
(45) Date of Patent: Mar. 19, 2013

(54) SCANNING PROBE MICROSCOPE WITH DRIFT COMPENSATION

(75) Inventors: Sang-il Park, Seongnam (KR); Hanaul Noh, Suwon (KR)

(73) Assignee: Park Systems Corp., Suwon (KR)

( * ) Notice: Subject to any disclaimer, the term of this patent is extended or adjusted under 35 U.S.C. 154(b) by 104 days.

(21) Appl. No.: 12/773,587

(22) Filed: May 4, 2010

(65) Prior Publication Data

US 2011/0277192 A1 Nov. 10, 2011

(51) Int. Cl.
*G01Q 10/00* (2010.01)
(52) U.S. Cl. .............. 850/1; 250/234; 73/150
(58) Field of Classification Search .............. 850/1
See application file for complete search history.

(56) References Cited

U.S. PATENT DOCUMENTS

| | | | |
|---|---|---|---|
| 5,210,410 A * | 5/1993 | Barrett ..................... 250/234 |
| 5,376,790 A | 12/1994 | Linker et al. |
| 5,440,920 A * | 8/1995 | Jung et al. ................. 73/105 |
| 5,948,972 A * | 9/1999 | Samsavar et al. ........... 73/105 |
| 6,032,518 A * | 3/2000 | Prater et al. ............... 73/105 |
| 6,057,547 A | 5/2000 | Park et al. |
| 6,677,567 B2 | 1/2004 | Hong et al. |
| 7,631,546 B2 | 12/2009 | Masser |

* cited by examiner

*Primary Examiner* — Phillip A Johnston
(74) *Attorney, Agent, or Firm* — Patterson & Sheridan, LLP (57) ABSTRACT

A scanning probe microscope compensates for relative drift between its upper structure that includes a probe and a scanner that scans the probe in a straight line and a lower structure that includes a sample stage and a scanner that scans the sample stage in a plane. A light beam from the upper structure is initially aligned with a center of a position sensitive photo detector (PSPD) disposed on the lower structure at a predetermined position of the sample stage and any subsequent misalignments of the light beam with the center of the PSPD at the predetermined position of the sample stage are determined to be caused by drift and compensated by the scanning probe microscope.

19 Claims, 10 Drawing Sheets

SCANNING PROBE MICROSCOPE WITH DRIFT COMPENSATION

BACKGROUND OF THE INVENTION

1. Field of the Invention

Embodiments of the present invention relate generally to scanning probe microscopes and, more particularly, to scanning probe microscope that is capable of compensating for drift.

2. Description of the Related Art

Scanning probe microscopes (SPMs) provide microscopic analysis of the topography or other characteristics of microscopic surfaces and are powerful instruments for the study of nanometer-scale features. SPMs include devices such as scanning force or atomic force microscopes (SFMs or AFMs), scanning tunneling microscopes (STMs), scanning acoustic microscopes, scanning capacitance microscopes, magnetic force microscopes, scanning thermal microscopes, scanning optical microscopes, and scanning ion-conductive microscopes. Generally, SPMs are a class of instruments that employ a technique of mapping the spatial distribution of a surface property of a sample by localizing the influence of the property to a small probe positioned in very close proximity to the sample surface. The probe moves relative to the sample and either measures the change in the property or follows constant contours of the property, and an image is typically formed by scanning the sample with respect to the probe in a raster pattern and recording data at successive points in the scan. Depending on the type of SPM, the scanning probe either contacts or rides slightly above the surface to be analyzed, e.g., on the order of a few hundred angstroms. In either case, resolution of the surface property is achievable on the nanometer scale.

One issue known to affect the accuracy of SPM measurements is drift, which is the positioning error caused by changes in relative position between a sample and a scanning probe. Drift in SPMs results from thermal and mechanical displacements that occur over a period of time. Sources of drift include vibration, hysteresis, expansion and contraction of SPM structures due to small temperature changes, and other factors. Because the probe and sample in an SPM have to be controlled to the accuracy of sub-nanometers, even very subtle external factors may contribute significantly to drift.

Because positioning errors in an SPM between the probe and the sample directly affect the performance of the SPM, and because minimizing each and every significant source of drift in an SPM is problematic if not impossible, there is a need in the art for a system and method to reduce the effect of drift on the performance of SPMs.

SUMMARY OF THE INVENTION

One or more embodiments of the invention provide a method and a system for compensating for drift in a scanning probe microscope (SPM). Specifically, embodiments of the invention employ a light source disposed on a head structure of an SPM configured with a probe and a position-sensitive photodetector (PSPD) disposed on a base structure of an SPM configured with a sample stage. The PSPD is configured to produce a signal based on a displacement of the head structure with respect to the base structure, thereby allowing precise position control of the probe relative to the sample stage that compensates for drift that may occur during operation of the SPM.

A scanning probe microscope, according to an embodiment of the invention, includes a probe head including a probe and a first scanner for changing a position of the probe along a straight line during imaging, a sample stage, a second scanner for changing a position of the sample stage in a plane during imaging, and a detector adjacent to the sample stage, wherein the probe head further includes a light source for generating a light beam and is configured to direct the light beam to be incident on the detector.

A scanning probe microscope, according to another embodiment of the invention, includes a probe head including a probe and a first scanner for changing a position of the probe along a straight line during imaging, a sample stage, a second scanner for changing a position of the sample stage in a plane during imaging, and a sensor having an upper portion mounted on the probe head and a lower portion mounted on the sample stage for detecting a position of the upper portion relative to the lower portion along three orthogonal axes.

A method of compensating for relative drift between upper and lower structures of a scanning probe microscope, wherein the upper structure includes a probe and a first scanner that changes a position of the probe along a straight line and the lower structure includes a sample stage and a second scanner for changing a position of the sample stage, comprises the steps of generating a light beam from the upper structure, determining a first position of the light beam on a detector arranged on the lower structure at a first point in time, determining a second position of the light beam on the detector at a second point in time, and controlling the second scanner to change the position of the sample stage based on the difference between the first position and the second position.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1A:
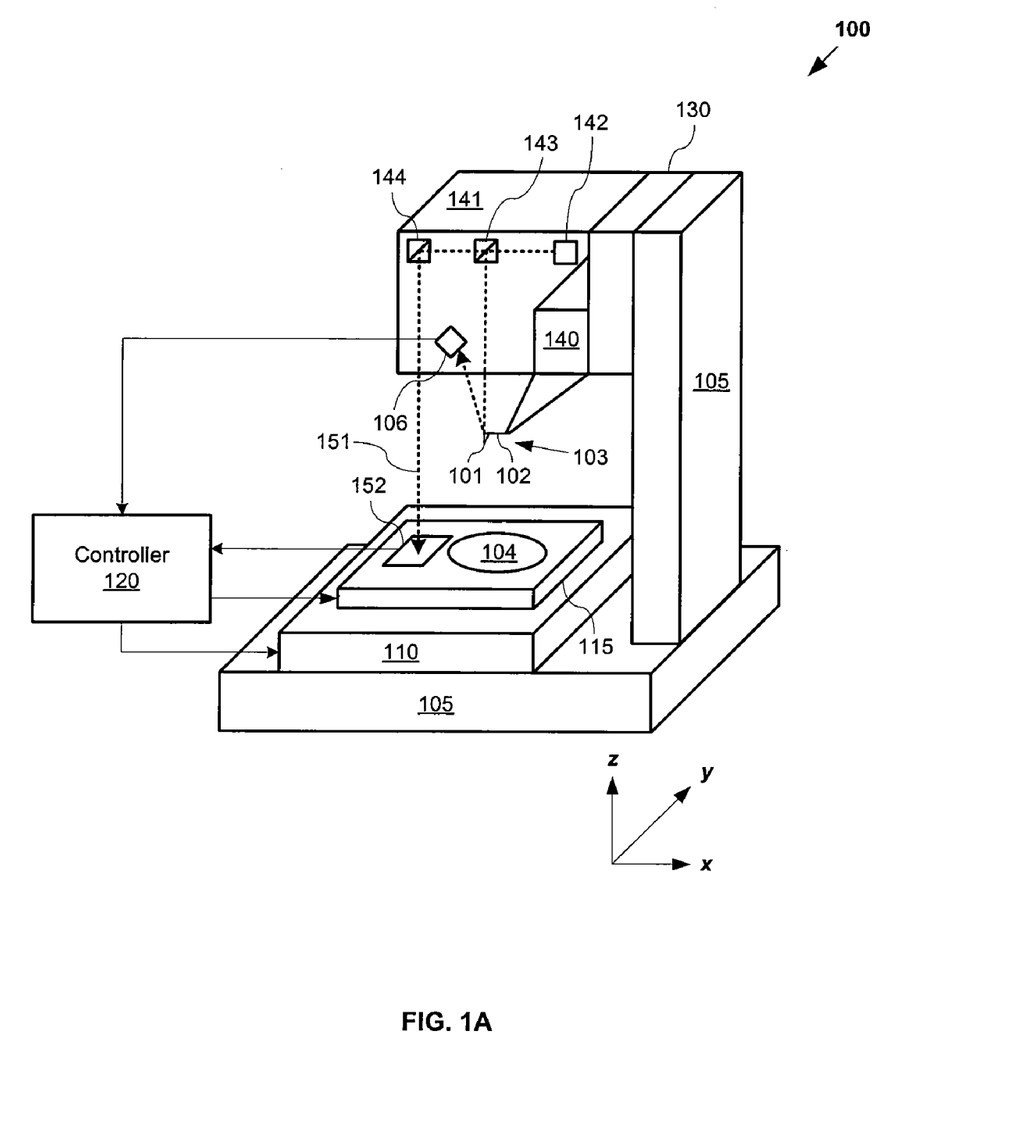
FIG. 1A is a schematic perspective view of a scanning probe microscope configured to compensate for drift, according to a first embodiment of the invention.

FIG. 1A is a schematic perspective view of an SPM 100 configured to actively compensate for drift. SPM 100 includes physically separate x-y scanner 115 and z scanner 140. Scanners 115 and 140 are mounted on a stationary frame 105 through respective coarse positioning stages that include an x-y stage 110 and a z stage 130. The x-y stage 110 and the z stage 130 are positioning stages that may be manually moved using positioning screws or automatically moved using stepper motors in response to control signals from a controller 120. They are mounted to stationary frame 105 and have a relatively large translation range, for example, on the order of several millimeters.

A probe 103, that includes a cantilever 102 and a tip 101, is attached to a probe head 141. The z scanner 140 moves probe 103 in the ±z direction during imaging of a sample. The sample that is imaged is mounted on a sample stage 104. The x-y scanner 115 moves sample stage 104 in the x-y plane to position the portion of the sample on sample stage 104 being imaged underneath probe 103.

In a first embodiment of the invention, shown in FIG. 1A, sample stage 104 is fixed with respect to the x-y scanner 115 and coarse movements in the x-y plane of sample stage 104 and the sample placed on sample stage 104 are achieved through movements of the x-y stage 110. In a second embodiment of the invention, shown in FIG. 1B, sample stage 116 is movable with respect to the x-y scanner 115 so that coarse movements in the x-y plane of the sample placed on sample stage 116 are achieved through movements of sample stage 116 or through movements of the x-y stage 110. In a third embodiment of the invention, sample stage 104 is mounted on a plate 170 rigidly mounted to a frame 117 shown in FIG. 1C. The plate 170 lies on top of the x-y scanner 115 and, prior to imaging, frame 117 can be moved in the x-y plane with respect to the x-y scanner 115. During imaging, frame 117 moves in unison with the x-y scanner 115.

Figure 1B:
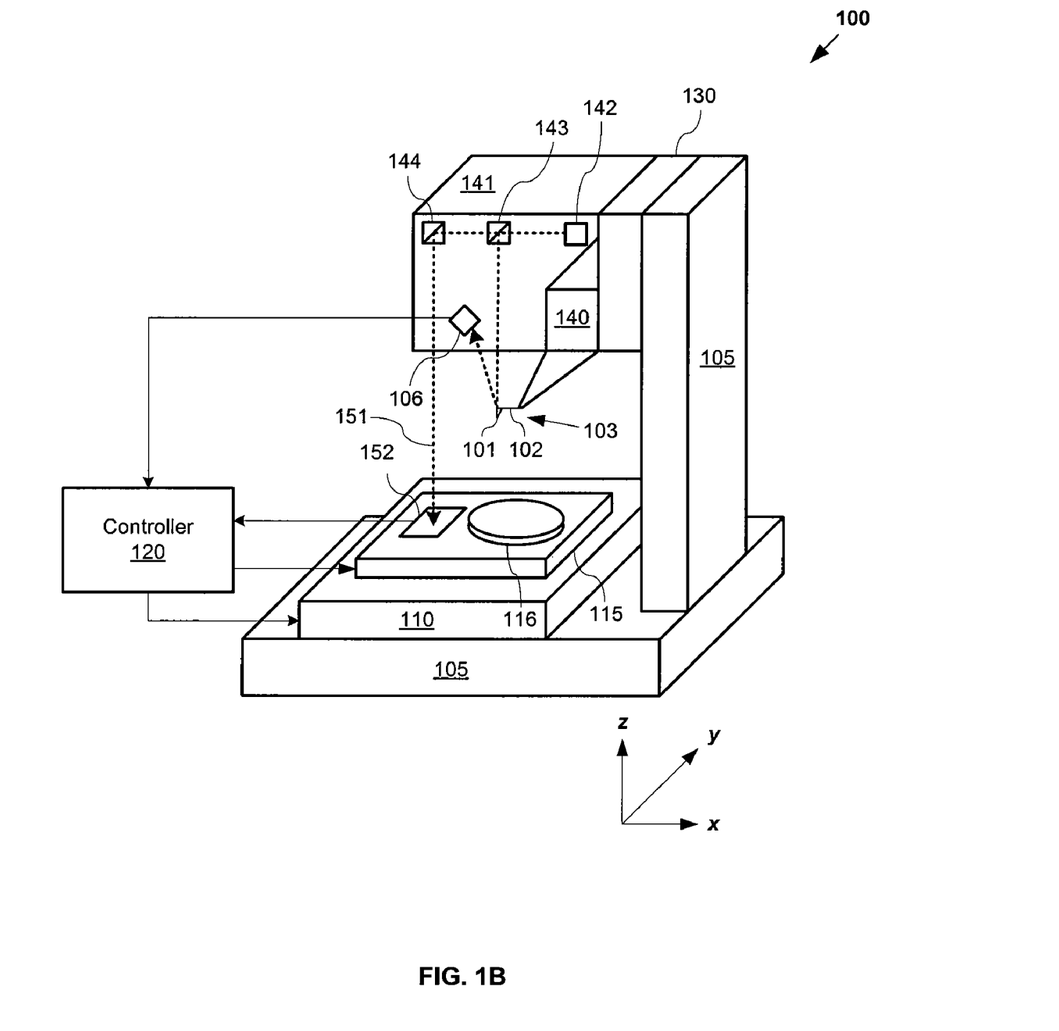
FIG. 1B is a schematic perspective view of a scanning probe microscope configured to compensate for drift, according to a second embodiment of the invention.
Figure 1C:
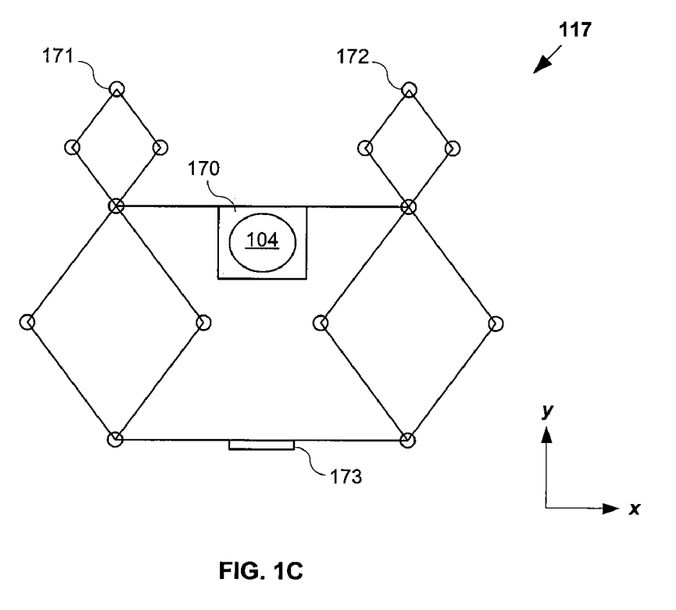
FIG. 1C is a top view of a frame used in positioning a sample stage in a scanning probe microscope configured to compensate for drift, according to a third embodiment of the invention.

Frame 117 has a plurality of rigid bars that are linked together through joints so that it can be moved in the x-y plane with respect to stationary frame 105. It can be moved manually using a handle 173 or moved automatically through a drive mechanism (not shown) connected to handle 173. Frame 117 has two joints 171, 172 that are fixed to stationary frame 105 so that movement in the x-y plane with respect to stationary frame 105 of the two joints 171, 172 are not permitted. However, rods connected to joints 171, 172 are freely pivotable about joints 171, 172.

The x-y scanner 115 is a two-dimensional flexure stage that moves sample stage 104/116 in the x-y plane. The two-dimensional flexure stage may be a stacked piezoelectric actuator or a hollow cylinder-type. The z scanner 140 is a one-dimensional piezoelectric actuator that moves probe head 141 and probe 103 in the ±z direction. The one-dimensional piezoelectric actuator may be in the form of a stacked piezoelectric actuator with a high resonance frequency (i.e., greater than 10 kHz) for fast z-axis scanning with respect to sample stage 104/116.

Before a desired region on the sample on sample stage 104/116 is imaged, the desired region is moved into position underneath probe 103. In the first embodiment, the x-y stage 110 is moved. In the second embodiment, sample stage 116 and/or the x-y stage 110 are moved. In the third embodiment, frame 117, on which sample stage 104 is mounted, and/or the x-y stage 110 are moved. In addition, probe 103 is moved using the z stage 130 and/or the z scanner 140 to bring tip 101 into close proximity with the sample.

After the desired region on the sample is moved into position underneath probe 103 and tip 101 is brought into close proximity with the sample for imaging using positioning stages 110 and 130, the sample is scanned in the x-y plane using the x-y scanner 115. As the sample is scanned in the x-y plane, forces between tip 101 and the sample surface cause cantilever 102 to deflect. The deflection of cantilever 102 is measured by casting a laser beam onto the backside of cantilever 102 and then detecting the position of the reflected beam using a position sensitive photo detector 106. A feedback mechanism is employed to continuously adjust the tip-to-sample distance so as to maintain a constant force between tip 101 and the sample surface. The continuous adjustment of the tip-to-sample distance is carried out by the z scanner 140 in response to position error signals detected by PSPD 106 as processed by controller 120. In the embodiment of FIG. 1, the laser beam used to measure the deflection of cantilever 102 is generated by a laser 142 and deflected toward the backside of cantilever 102 by an optical element 143.

The SPM 100 according to one or more embodiments of the invention also includes a global positioning sensor in the form of a position sensitive photo detector (PSPD) 152. PSPD 152 is disposed in close proximity to sample stage 104/116, e.g., arranged on the x-y scanner 115 adjacent to sample stage 104/116, and positioned to receive a laser beam 151 from probe head 141 at a predetermined position of the x-y stage 110. In one embodiment, laser beam 151 has the same source as the laser beam that is used to measure the deflection of cantilever 102. In this embodiment, optical element 143 is configured as a beam splitter that deflects a portion of the laser beam toward the backside of cantilever 102. The remainder of the laser beam is transmitted through the beam splitter and is deflected toward PSPD 152 by a mirror 144 as laser beam 151.

Figure 2:
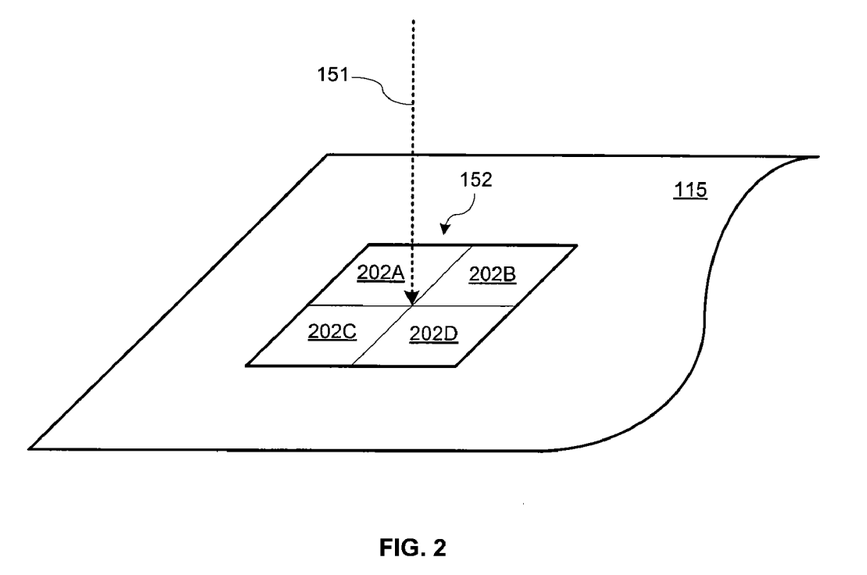
FIG. 2 is an expanded view of a position-sensitive photodetector (PSPD) that provides an output signal based on the position of a laser beam incident on the PSPD, according to embodiments of the invention.

FIG. 2 is an expanded view of PSPD 152 that provides an output signal based on the position of incident laser beam 151 on PSPD 152. As shown, PSPD 152 is a quad-cell PSPD having four quadrants defined by subcells 202A-202D. In one embodiment, during set-up, the (x, y) position of the x-y stage 110 corresponding to a zero error state of PSPD 152 (i.e., the position where incident laser beam 151 strikes the center of PSPD 152) is recorded. For convenience, this position is referred to as the (x0, y0) position. During subsequent imaging, any deviation from this center is processed by controller 120 as positioning error resulting from relative thermal and mechanical drift in the large mechanical loop between upper and lower structures of SPM 100.

PSPD 152 is oriented so that the detection directions of subcells 202A-202D are substantially aligned with the x and y axes. Such alignment facilitates the use of output signals from PSPD 152 as an accurate indication of positioning errors caused by drift in the x and y axes. For example, the outputs of subcells 202A and 202B are summed and compared with the sum of the outputs of subcells 202C and 202D to obtain an output voltage representing the y-displacement error. Similarly, the outputs of subcells 202A and 202C are summed and compared with the sum of the outputs of subcells 202B and 202D to obtain an output voltage representing the x-displacement error.

Figure 3A:
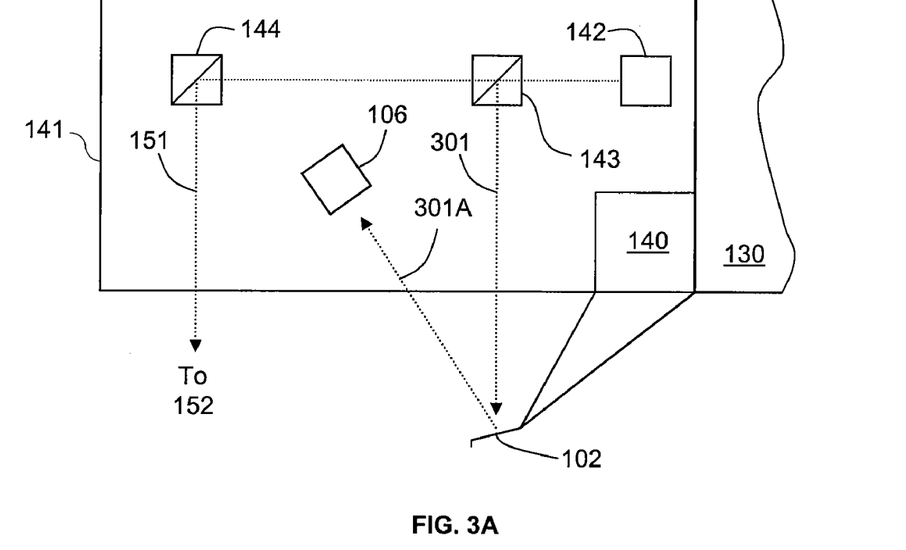
FIG. 3A is a schematic view of a probe head according to an embodiment of the invention.

FIG. 3A is a schematic view of probe head 141 according to an embodiment of the invention. In this embodiment, probe head 141 includes laser 142, optical element 143, and a mirror 144. In operation, laser 142 in conjunction with optical element 143 directs a first laser beam 301 to the backside of cantilever 102 and laser beam 151 to mirror 144. First laser beam 301 reflects off the backside of cantilever 102 and becomes incident on PSPD 106. Laser beam 151 reflects off mirror 144 and becomes incident on PSPD 152.

Figure 3B:
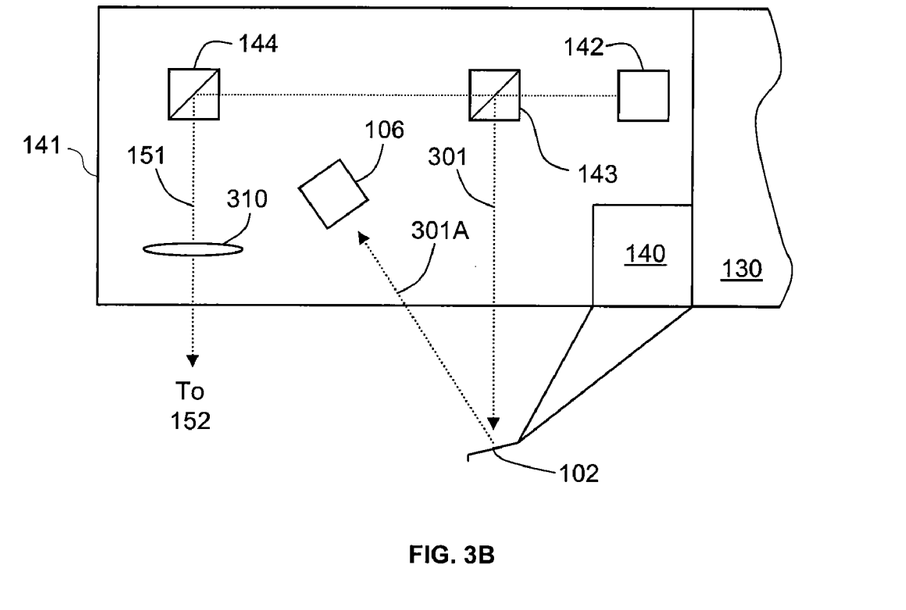
FIG. 3B is a schematic view of a probe head according to another embodiment of the invention.

FIG. 3B is a schematic view of probe head 141 according to another embodiment of the invention. In this embodiment, a collimating lens 310 is provided in the optical path between mirror 144 and PSPD 152 to minimize the effect of vertical position of probe head 141 on the beam size of laser beam 151 that becomes incident on PSPD 152. Because collimating lens 310 is configured to collimate laser beam 151, changes in the vertical position of probe head 141, which changes the distance between mirror 144 and PSPD 152, will not affect the beam size of laser beam 151 that becomes incident on PSPD 152 and thus the accuracy of output signal from PSPD 152.

In alternative embodiments of the invention, a light source other than a laser source, such as an LED, is used to generate the light beams that become incident on PSPD 106 and PSPD 152. Also, two separate light sources may be used, one for producing the light beam incident on PSPD 106 and the other for producing the light beam incident on PSPD 152. When two separate light sources are used, mirror 144 is no longer necessary and optical element 143 may be replaced with a mirror.

Figure 4A:
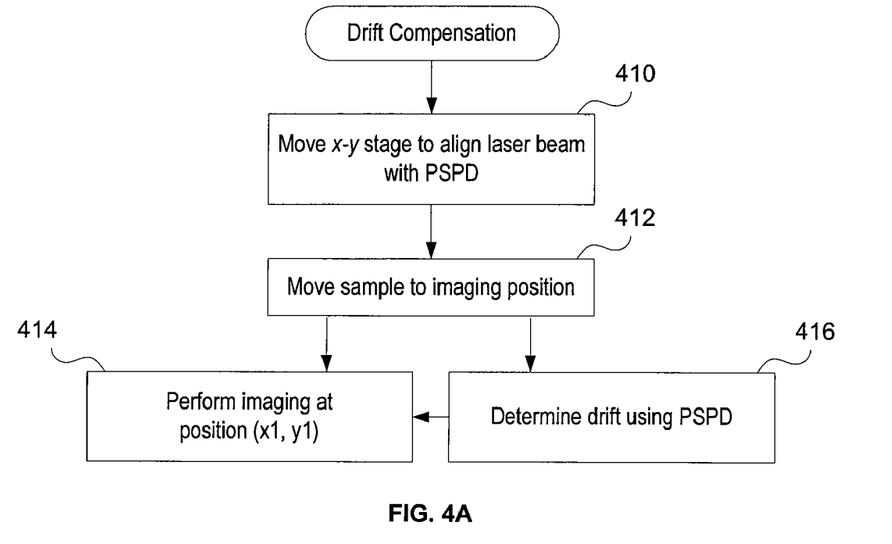
FIG. 4A is a block diagram illustrating the process by which an SPM compensates for the positioning error sensed by a PSPD during imaging of a sample.

FIG. 4A is a block diagram illustrating the process by which SPM 100 compensates for the positioning error sensed by PSPD 152 during imaging of a sample. The second and third embodiments described above in conjunction with FIGS. 1B and 1C are used to carry out this process. In block 410, controller 120 moves the x-y stage 110 so that laser beam 151 is aligned to strike the center of PSPD 152. In block 412, the sample is moved to the imaging position. This is accomplished in the second embodiment by moving sample stage 116 and in the third embodiment by moving frame 117. The movement may be manual or automatic using controller 120 and associated drive mechanisms such as stepper motors. After the sample has been moved to the imaging position, imaging is carried out in block 414 by scanning sample stage 104/116 in the x-y plane. In parallel with block 414, block 416 is carried out. In block 416, the positioning errors are determined from outputs of PSPD 152 using controller 120. Controller 120 compensates for the determined positioning errors in real-time while it controls the x-y scanner 115 during imaging.

Figure 4B:
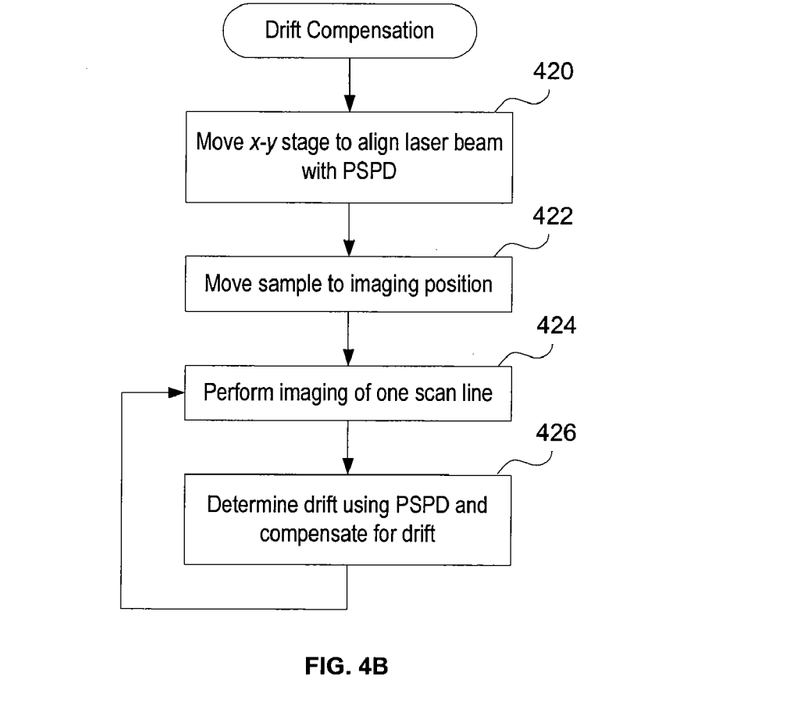
FIG. 4B is a block diagram illustrating another process by which an SPM compensates for the positioning error sensed by a PSPD during imaging of a sample.

FIG. 4B is a block diagram illustrating another process by which SPM 100 compensates for the positioning error sensed by PSPD 152 during imaging of a sample. The second and third embodiments described above in conjunction with FIGS. 1B and 1C are used to carry out this process. In block 420, controller 120 moves the x-y stage 110 so that laser beam 151 is aligned to strike the center of PSPD 152. In block 422, the sample is moved to the imaging position. This is accomplished in the second embodiment by moving sample stage 116 and in the third embodiment by moving frame 117. The movement may be manual or automatic using controller 120 and associated drive mechanisms such as stepper motors. After the sample has been moved to the imaging position, sample imaging is carried out one line at a time and drift compensation is performed after imaging each line. More particularly, in block 424, sample stage 104/116 is scanned along a straight line. At the end of that scan line, block 426 is carried out. In block 426, the positioning errors are determined from outputs of PSPD 152 using controller 120. Controller 120 compensates for the determined positioning errors by moving sample stage 104/116 using the x-y scanner 115 prior to imaging the sample along another line when the process returns to block 424.

Figure 4C:
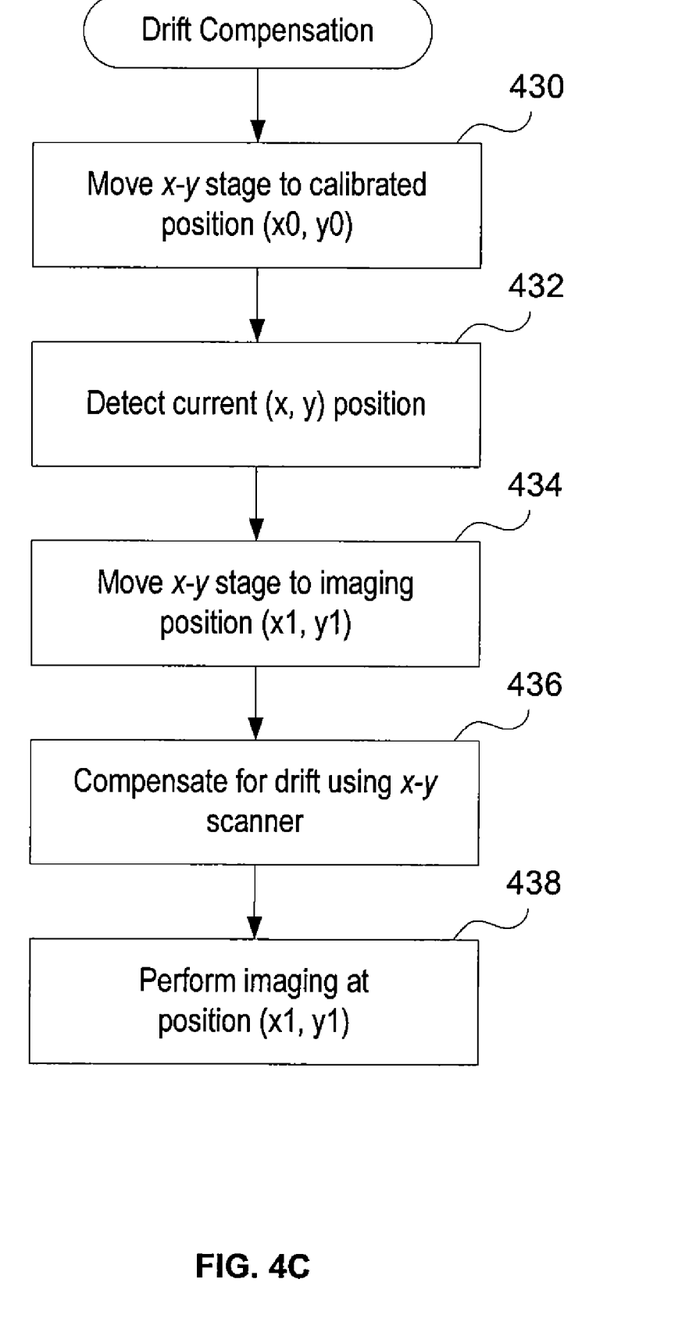
FIG. 4C is a block diagram illustrating still another process by which an SPM compensates for the positioning error sensed by a PSPD during imaging of a sample.

FIG. 4C is a block diagram illustrating the process according to another embodiment by which SPM 100 compensates for the positioning error sensed by PSPD 152 during imaging of a sample at imaging position (x1, y1). In block 430, controller 120 moves the x-y stage 110 to the calibrated (x0, y0) position corresponding to a zero error state of PSPD 152. Then, in block 432, after the x-y stage 110 has been moved to the recorded (x0, y0) position, controller 120 determines the (x, y) position of probe head 141 using signals generated by PSPD 152 when laser beam 151 becomes incident on PSPD 152. In blocks 434 and 436, respectively, controller 120 moves the x-y stage 110 to the imaging position (x1, y1) and controller 120 compensates for the positioning errors using the x-y scanner 115. The positioning errors are determined to be x-x1 and y-y1. After compensation, in block 438, imaging is carried out at position (x1, y1) by scanning sample stage 104 in the x-y plane. For imaging of a sample at another position, e.g., imaging position (x2, y2), this process is repeated except in block 434, controller 120 moves the x-y stage 110 to the imaging position (x2, y2).

Figure 5:
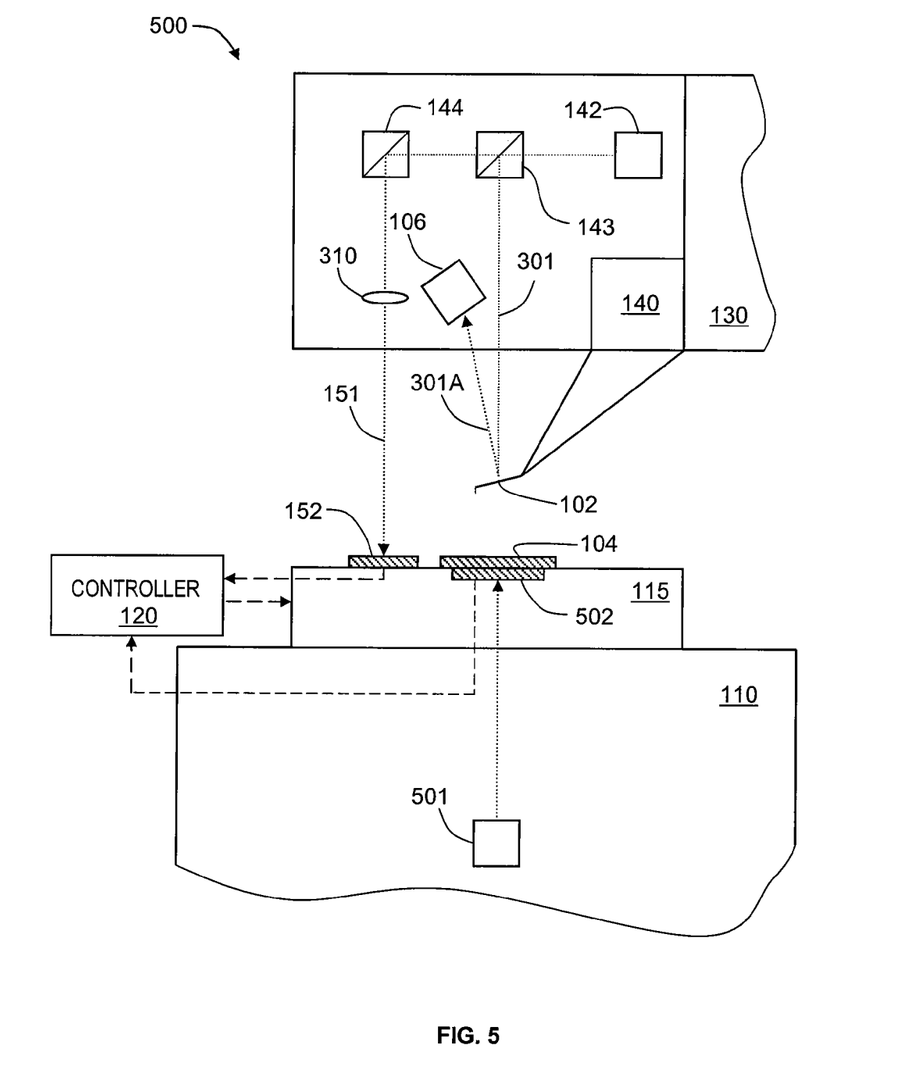
FIG. 5 illustrates a partial schematic view of an SPM according to another embodiment of the invention.

FIG. 5 illustrates a partial schematic view of an SPM 500 according to another embodiment of the invention. SPM 500 is substantially similar to SPM 100 and further compensates for local drift occurring in the x-y scanner 115. For local drift compensation, SPM 500 includes a laser source 501 disposed in the x-y stage 110 and a quad-cell PSPD 502 disposed in the x-y scanner 115. As shown, PSPD 502 is arranged underneath sample stage 104/116 so as to locate PSPD 502 as close to sample stage 104/116 as possible. Laser source 501 and quad-cell PSPD 502 operate in a substantially similar manner as laser source 141 and PSPD 152 in FIGS. 1 and 2. Positioning errors detected by PSPD 502 are compensated by controller 120 prior to scanning sample stage 104/116 in the x-y plane.

The position of laser source 501 can be varied depending on the expected source of local drift. If local drift is expected to occur primarily in the x-y scanner 115, laser source can be positioned at the interface of the x-y scanner 115 and the x-y stage 110. If local drift is expected to occur in both the x-y scanner 115 and the x-y stage 110, laser source can be positioned at the interface of the x-y stage 110 and stationary frame 105.

Figure 6:
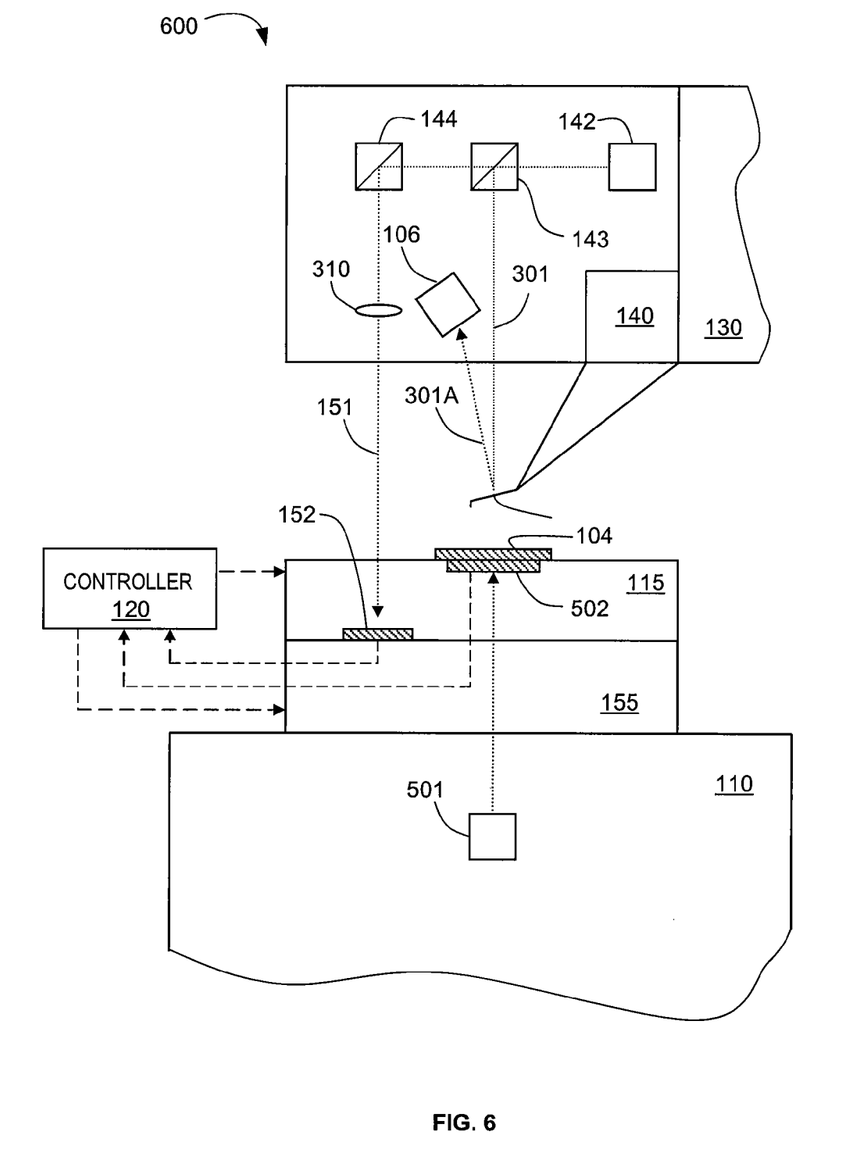
FIG. 6 illustrates a partial schematic view of an SPM according to still another embodiment of the invention.

FIG. 6 illustrates a partial schematic view of an SPM 500 according to still another embodiment of the invention. SPM 600 is substantially similar to SPM 500, except SPM 600 has an additional x-y scanner 155 disposed between the x-y scanner 115 and the x-y stage 110 and PSPD 152 is disposed on this additional x-y scanner 155. The additional x-y scanner 155 is used for drift compensation between the upper and lower structures of the SPM 600 as sensed by PSPD 502.

Figure 7:
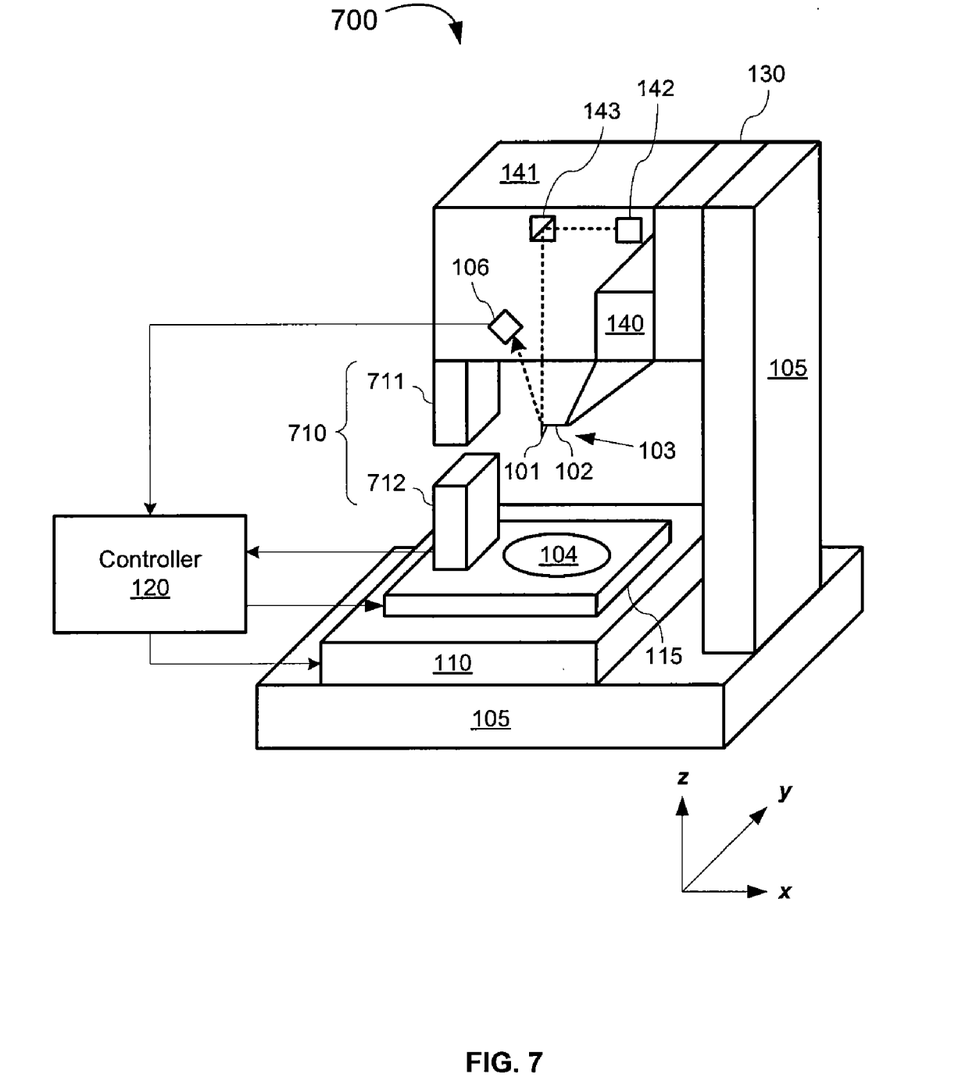
FIG. 7 is a schematic diagram of an SPM that compensates for drift along three orthogonal axes, according to one or more embodiments of the invention.

FIG. 7 is a schematic diagram of an SPM 700 that compensates for drift along three orthogonal axes, i.e., in the x-, y-, and z-directions, according to one or more embodiments of the invention. SPM 700 is substantially similar to SPM 500 except SPM 700 employs a global position control sensor 710 in place of PSPD 152 to detect positioning errors caused by drift. In addition, as in SPM 500, SPM 700 may employ a sample stage 104 that is fixed or movable in the x-y plane with respect to the x-y scanner 115 or mounted to a plate that is attached to a frame that is movable in the x-y plane with respect to the x-y scanner 115.

Figure 8:
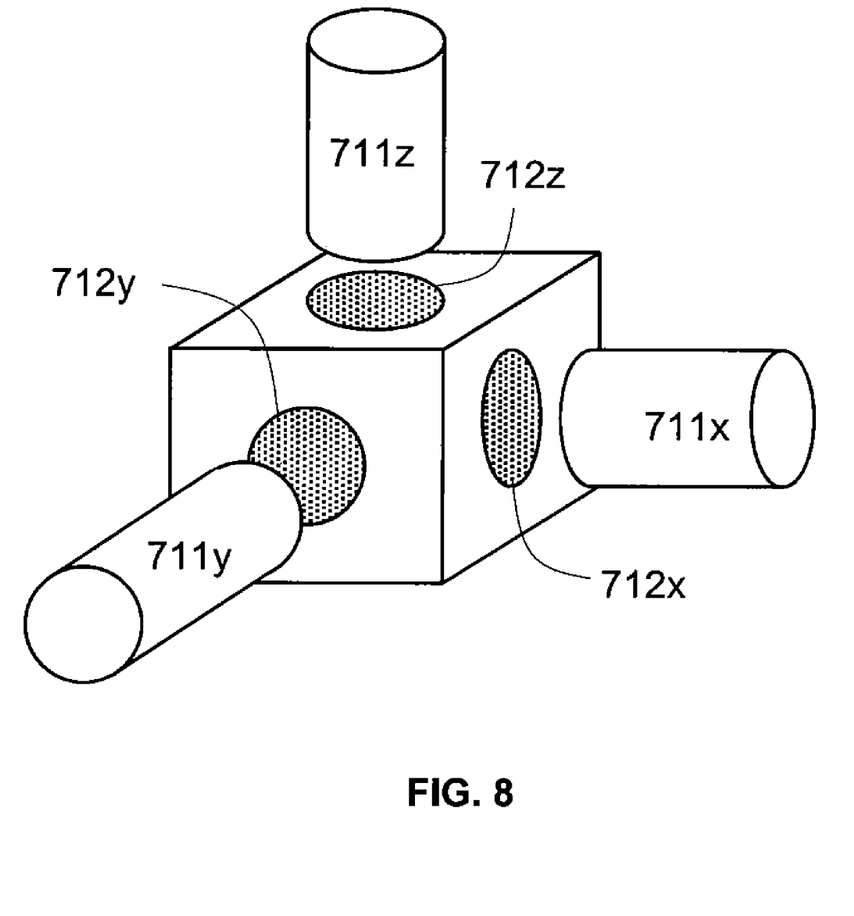
FIG. 8 is a schematic perspective view of a global position control sensor that includes an upper portion and a lower portion, according to one or more embodiments of the invention.

Global position control sensor 710 includes an upper portion 711 and a lower portion 712. Upper portion 711 is mounted on probe head 141 and lower portion 712 is mounted on sample stage 104/116, as shown. As shown in FIG. 8, upper portion 711 has an x-axis component 711x, y-axis component 711y, and a z-axis component 711z, and lower portion 712 has corresponding x-axis, y-axis, and z-axis components 712x, 712y, and 712z. Global position control sensor 710 senses the proximity of the components of upper portion 711 to the corresponding components of lower portion 712, and generates three signals, one each of the three axes, in proportion to the sensed proximity. Any change in the three signals is considered as drift and compensated by controller 120 prior to imaging. In one embodiment, global position control sensor 710 includes one or more photodetector-based sensors, linear variable differential transformers (LVDTs), capacitive sensors, or a combination thereof, to carry out the proximity sensing.

In FIGS. 7 and 8, the x-axis, y-axis, and z-axis components of global position control sensor 710 are arranged at one position of probe head 401 and sample stage 104/116. In alternative embodiments, each of the x-axis, y-axis, and z-axis components of global position control sensor 710 may be arranged at different positions of probe head 401 and sample stage 104/116.

In sum, embodiments of the invention have the advantage of enabling drift compensation in an SPM prior to imaging of a sample. Such compensation may be in the x-y plane, i.e., the plane of the sample, along the z-axis, i.e., orthogonal to the plane of the sample, or both. In this way, the effects of thermal and mechanical displacements inherent in the structures in SPMs that hold and position a sample and that hold and position a probe can be significantly reduced.

While the foregoing is directed to embodiments of the present invention, other and further embodiments of the invention may be devised without departing from the basic scope thereof, and the scope thereof is determined by the claims that follow.

We claim:

1. A scanning probe microscope comprising:
a probe head including a probe and a first scanner for changing a position of the probe during imaging;
a sample stage;
a second scanner for changing a position of the sample stage in a plane during imaging; and
a position sensitive detector adjacent to the sample stage,
wherein the probe head further includes a light source for generating a light beam and is configured to direct the light beam to be incident on the position sensitive detector, and
wherein the first scanner is controlled to move the probe during imaging along a direction that is perpendicular to the plane, and the second scanner is controlled to move the sample stage during imaging in the plane based on signals generated by the position sensitive detector during imaging.

2. The scanning probe microscope of claim 1, further comprising a positioning stage that positions the sample stage prior to imaging.

3. The scanning probe microscope of claim 2, wherein the position sensitive detector is mounted on the second scanner to be moved in unison with the sample stage.

4. The scanning probe microscope of claim 1, wherein the position sensitive detector is a position sensitive photo detector.

5. The scanning probe microscope of claim 1, further comprising a controller that controls the second scanner based on the signals generated by the position sensitive detector during imaging.

6. The scanning probe microscope of claim 5, wherein the controller determines positioning error based on the signals from the position sensitive detector and changes the position of the sample stage to compensate for the positioning error.

7. The scanning probe microscope of claim 1, wherein the probe head further includes a beam deflector for directing the light beam to be incident on the position sensitive detector.

8. The scanning probe microscope of claim 7, wherein the probe head further includes a collimating lens disposed in an optical path of the light beam deflected by the beam deflector.

9. The scanning probe microscope of claim 7, wherein the probe head further includes a beam splitter that directs a portion of the light beam toward the probe and a remaining portion of the light beam toward the beam deflector.

10. The scanning probe microscope of claim 1, further comprising a third scanner for changing the position of the sample stage during imaging.

11. The scanning probe microscope of claim 10, wherein the third scanner changes the position of the sample stage during imaging based on the signals generated by the position sensitive detector during imaging.

12. A scanning probe microscope comprising:
a probe head including a probe and a first scanner for changing a position of the probe during imaging;
a sample stage;
a second scanner for changing a position of the sample stage in a plane during imaging; and
a sensor having an upper portion mounted on the probe head and a lower portion mounted on the sample stage for detecting a position of the upper portion relative to the lower portion along three orthogonal axes,
wherein the first scanner is controlled to move the probe during imaging along a direction that is perpendicular to the plane, and the second scanner is controlled to move the sample stage during imaging in the plane, the second scanner being controlled to move the sample stage during imaging in the plane in a manner that compensates for relative drift of the probe head relative to the sample stage during imaging, the relative drift being detected by the sensor during imaging based on the position of the upper portion of the sensor relative to the lower portion of the sensor along three orthogonal axes.

13. The scanning probe microscope of claim 12, wherein the upper portion has three components, one each for the three orthogonal axes, and the lower portion has three components, one each for the three orthogonal axes.

14. The scanning probe microscope of claim 13, wherein the three components of the upper portion are mounted on the probe head at substantially the same location and the three components of the lower portion are mounted on the sample stage at substantially the same location.

15. The scanning probe microscope of claim 13, wherein the three components of the upper portion are mounted on the probe head at substantially different locations and the three components of the lower portion are mounted on the sample stage at substantially different locations.

16. A method of compensating for relative drift between upper and lower structures of a scanning probe microscope, wherein the upper structure includes a probe and a first scanner that changes a position of the probe and the lower structure includes a sample stage and a second scanner for changing a position of the sample stage in a plane, said method comprising the steps of:

generating a light beam from the upper structure;

determining a first position of the light beam on a detector arranged on the lower structure at a first point in time relative to a start of the imaging;

determining a second position of the light beam on the detector at a second point in time during imaging after the first point in time;

controlling the second scanner to change the position of the sample stage in the plane during imaging while compensating for the relative drift between upper and lower structures of the scanning probe microscope in the plane, which is determined based on a difference between the first position and the second position; and controlling the first scanner during imaging to move the probe along a direction that is perpendicular to the plane as the second scanner is changing the position of the sample stage in the plane.

17. The method of claim 16, wherein the lower structure further includes a third scanner for changing the position of the sample stage in the plane during imaging.

18. The method of claim 16, wherein the lower structure further includes a positioning stage for the second scanner, and the detector is moved by the positioning stage in unison with the second scanner.

19. The method of claim 17, wherein the detector is moved by the second scanner in unison with the sample stage.

* * * * *